United States Patent
Buford et al.

(10) Patent No.: US 9,477,371 B2
(45) Date of Patent: Oct. 25, 2016

(54) MEETING ROSTER AWARENESS

(71) Applicant: Avaya Inc., Basking Ridge, NJ (US)

(72) Inventors: John F. Buford, Princeton, NJ (US); Kundan Singh, San Francisco, CA (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 505 days.

(21) Appl. No.: 13/920,388

(22) Filed: Jun. 18, 2013

(65) Prior Publication Data

US 2014/0372909 A1   Dec. 18, 2014

(51) Int. Cl.

| G06F 3/048 | (2013.01) |
|---|---|
| G06F 3/0481 | (2013.01) |
| G06Q 10/00 | (2012.01) |
| H04L 29/06 | (2006.01) |

(52) U.S. Cl.
CPC ............ *G06F 3/0481* (2013.01); *G06Q 10/00* (2013.01); *H04L 65/403* (2013.01)

(58) Field of Classification Search
CPC ....... G06Q 10/10; G06F 3/0481; H04N 7/15
USPC .......................................................... 715/753
See application file for complete search history.

(56) References Cited

U.S. PATENT DOCUMENTS

| 7,885,901 B2 | 2/2011 | Hull et al. |
|---|---|---|
| 7,949,759 B2 | 5/2011 | Appelman |
| 8,140,619 B2 | 3/2012 | Lyle et al. |
| 8,346,864 B1* | 1/2013 | Amidon ............ H04L 65/1069 709/204 |
| 2007/0172047 A1* | 7/2007 | Coughlan ............... H04M 3/56 379/202.01 |
| 2010/0228560 A1 | 9/2010 | Balasaygun et al. |
| 2011/0022967 A1 | 1/2011 | Vijayakumar et al. |
| 2011/0194682 A1 | 8/2011 | Hans et al. |
| 2011/0231396 A1 | 9/2011 | Dhara et al. |
| 2012/0102119 A1 | 4/2012 | Balogh et al. |
| 2012/0246574 A1* | 9/2012 | Hoard .................... G06Q 50/01 715/751 |
| 2012/0306993 A1* | 12/2012 | Sellers-Blais ....... H04L 65/1009 348/14.08 |
| 2012/0331387 A1* | 12/2012 | Lemmey ............... G06F 1/1694 715/727 |
| 2013/0019187 A1* | 1/2013 | Hind .................... H04L 65/4023 715/753 |
| 2013/0041947 A1* | 2/2013 | Sammon ............ H04L 12/1822 709/204 |
| 2013/0106985 A1* | 5/2013 | Tandon ................. H04N 7/157 348/14.08 |
| 2013/0169742 A1* | 7/2013 | Wu ........................ H04N 7/157 348/14.08 |
| 2013/0290434 A1* | 10/2013 | Bank ................... H04L 12/1822 709/206 |
| 2014/0258399 A1* | 9/2014 | Bradley ............... H04L 12/185 709/204 |
| 2014/0372909 A1* | 12/2014 | Buford ................. G06F 3/0481 715/753 |
| 2015/0085056 A1* | 3/2015 | Van Broeck ............ G06F 3/013 348/14.1 |
| 2015/0149552 A1* | 5/2015 | Oh ........................ G06Q 10/10 709/204 |

* cited by examiner

*Primary Examiner* — David Phantana Angkool
(74) *Attorney, Agent, or Firm* — Sheridan Ross P.C.

(57) ABSTRACT

Disclosed herein are systems, methods, and non-transitory computer-readable storage media for providing meeting roster awareness for participants in a conference. An example system configured to practice this method can first identify participants in a conference, and retrieve, from a source external to the conference, information describing relationships between the participants. Then the system can compute, based on the information, a relationship graph assigning a relationship strength for at least two of the participants. The system provides an indication of the relationship strength to one of the participants, such as providing an indication of relationships of which other participants are not aware. Sources external to the conference can include a social network, a communication history, an organizational chart, a directory, or group membership, for example.

20 Claims, 5 Drawing Sheets

MEETING ROSTER AWARENESS

BACKGROUND

1. Technical Field

The present disclosure relates to scheduling and more specifically to determining scheduling priority information based on context of a calendar event.

2. Introduction

Advances in telecommunications technology and infrastructure have enabled many different type of virtual conferencing platforms, such as voice conferences, video conferences, and web conferences. Along with the increasing prevalence of such conferences, a conference participant is often unfamiliar with at least some of the other participants in the conference call. For example, the number of participants may be very large, or participants may join from different organizations or work sites. A call moderator may opt to call roll or ask each participant to give a self-introduction. However, such activities take time away from the meeting, and provide information in a way that may be difficult for the other participants to assimilate.

Some conference platforms provide limited information to alleviate this problem, however, the information is very limited and often fails to provide the right type or quantity of information. For example, many existing conference systems display user names, such as the user names that users enter when connecting to a web conference, and their contact information such as email address, phone number, or instant messaging address. Some conference systems incorporate social networking profiles for people within a particular user's social network. This approach can provide some additional data, but because of the existing social network connection, this information may be redundant. For participants outside a user's social network, or whose social network profile is not public, the information provided can be insufficient.

Further, this additional information fails to provide any indication of strength of social relationships, such as frequency of interaction, modalities of interaction, and so forth. All connections and data are presented as equals, so that a connection from 5 years ago and having frequent contact is equivalent to a connection that was made last week.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for enabling conference participants to quickly view information about other participants of the conference roster including their organization role and activities, their relationships with others on the conference call, their collaboration history, their professional social network and so on. Although some of this information can be obtained from employee directories or a participant's contact list, other items such as relationships between people can be obtained by processing participants' communications and collaboration activities. One example system can process prior communication history (email, instant messages, phone calls, collaboration sessions, web conferences, etc.) to compute a graph of relationships between members of a communication roster, and assigns a strength of relationship based on automatically determined or user-specified criteria such as joint authoring of documents, or frequency of communication exchanges. A representation of the relationships of members of the roster is presented to the participant.

An example system can identify participants in a conference, and retrieve, from a source external to the conference, information describing relationships between the participants. External sources can include, for example, participant home pages or web pages, employee directories, professional social networks, organizational charts, group membership, and communication or collaboration histories that are not connected to the roster of the web conference. The information describing relationships between the participants can include communication frequency, communication duration, communication content, quantity of communications, joint authorship of a document, or shared calendar events.

The system can compute, based on the information, a relationship graph assigning a relationship strength for at least two of the participants, and provide an indication of the relationship strength to one of the participants. The indication of the relationship strength can include a simple indication that a relationship exists, or can be more complex, such as an indication of a position in an organizational hierarchy, a number of communications between two participants, content or snippets of content from the relationship history, and so forth. In one embodiment, the indication is an image or icon representing the relationship type, duration, strength, source, or some other attribute of the relationship. For example, the indication of the relationship strength can include rendering a numerical indication of the relationship strength between two participants. As another example, the system can provide the indication of the relationship strength by identifying an attribute of the relationship strength, and rendering the attribute as part of the indication. The system can display the relationship information when a user hovers a cursor over a representation of a participant in a video conference display, in a similar manner to hovering over an email address in an email program can display additional contact information about that person if such information is available in a contact list.

Further, a user can provide input to the system directed to the indication of relationship strength. Responsive to receiving the input, the system can provide additional details describing the indication of the relationship strength. The additional details can be provided as a multi-level hierarchy through which the user can drill down to progressively more and more specific details. In one embodiment, the system can receive additional participant or relationship information on the fly, and provide the additional information with the indication of the relationship strength either on demand or as the additional information is received. In one variation, the system can provide an alert that additional information has been received, and if the user interacts with the alert, then the system can present all or part of that additional information to the user. In another variation, the system evaluates how well one of the participants knows the relationship strength, and adjusts the type or quantity of information in the indication based on the evaluation.

The relationship information and relationship strength information as rendered for a particular user is not limited to information found in that particular user's contacts. Further, the information is not restricted to individuals who are already social connections on a social network for the particular user. The system can update the additional relationship information as users join the group. Further, as individuals join or leave the communication session, the system can update the roster of participants and the various relationships between the participants. The system does not establish relationships based solely on a current context, and may completely ignore the current context, instead focusing on relationships between participants based on prior communications, organization relationships, and level of collaboration. The smart roster awareness system can allow each participant in a communication session, such as a video, audio, telephone, or other form of conference, to view information about the other participants in the session, and to see the relationships between subsets of participants in the session and to see the strength of these relationships according to a variety of criteria.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
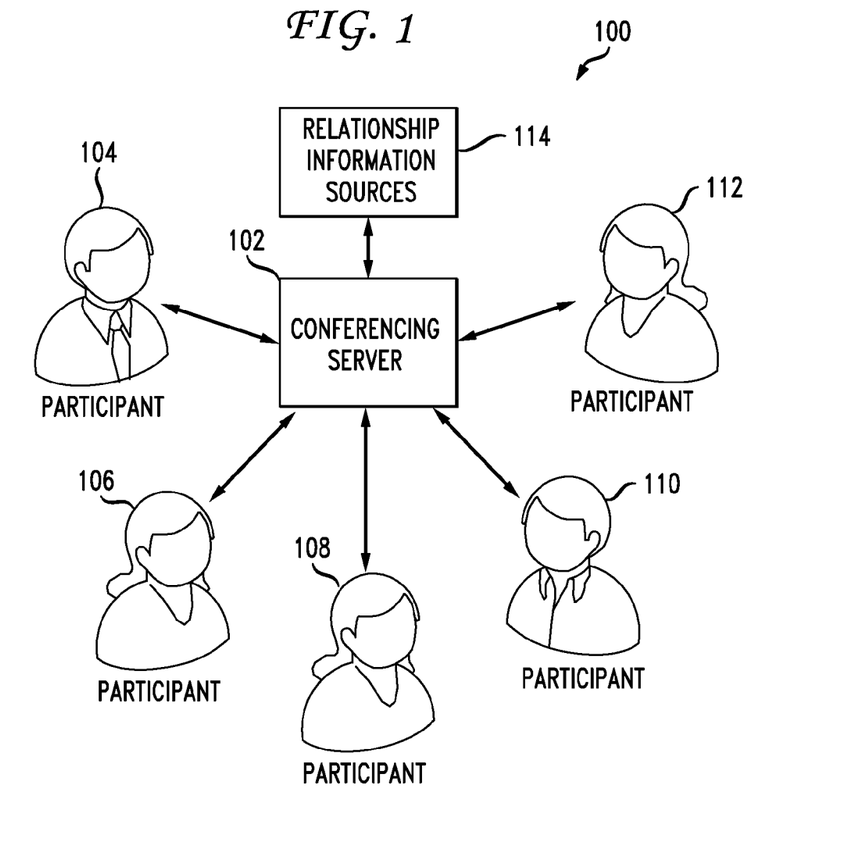
FIG. 1 illustrates an example high level view of a conferencing server with meeting roster awareness.

FIG. 1 illustrates an example high level view 100 of a conferencing server 102 with meeting roster awareness. The conferencing server 102 enables a user to easily and quickly learn about important relationships of others in a conference about which the user may know little or nothing. The conferencing server 102 can be a single entity or multiple entities that coordinate to facilitate a conference or collaboration session, such as a video conference, audio or telephone conference, a conference in a virtual environment, a combined hybrid screen broadcast and audio conference, or any other type of conferencing with multiple participants 104, 106, 108, 110, 112. In this example, participant 104 joins the conferencing server 102 first. At this point, the conferencing server does not need to display any relationship information, because no other participants are in the conference. However, at this point, or before the beginning of the conference, the conferencing server 102 can query one or more relationship information sources 114 to retrieve relationship information for anticipated or committed participants. For example, as soon as a user commits to the conference, such as by clicking "accept" on an invitation, the conferencing server 102 can retrieve and begin compiling relationship information for meeting roster awareness even before the conference begins. The conferencing server 102 can present such information gathered in advance to participant 104 while waiting for other participants to join. Alternatively, as additional participants 106, 108, 110, 112 join the conference the conferencing server 102 can retrieve and/or populate relationship information for participants that have joined. When participants 106, 108 join the conference, the conferencing server 102 can display information about them to participant 104 who is already in the conference.

The conferencing server 102 can provide signals or information to various client devices of the participants 104, 106, 108, 110, 112 in the conference, such as via a software interface. Thus, each participant can have a same, similar, or different view of the conference, as well as of the relationships of the various other participants. For example, the conferencing server 102 can present information about the relationship between participant 104 and participant 106 to the remaining participants 108, 110, 112, but not to participant 104 and participant 106 because they are already aware of their relationship and history. While the conferencing server 102 is depicted as a separate entity, the conferencing server 102 can be integrated as part of the infrastructure providing the conferencing services. However, all or part of the functionality of the conferencing server 102 can also be integrated as components of client devices participating in the conference.

The conferencing server 102 can provide a self-view for each participant to see, control, or otherwise manage what information is shared with other participants. The conferencing server 102 can provide this self-view before, during, or after the conference. For example, a participant may wish to hide certain relationships, conversations, or other information from one or more other participants. Alternatively, the participant may wish to place emphasis on particular context information for one or more other participants. The self-view can allow a participant to manage which pieces of context are used to calculate relationship information for roster awareness, and can guide how roster awareness information is presented to other participants. The self-view can also provide an analytics function so that a participant can see a report of what was presented to others.

Figure 2:
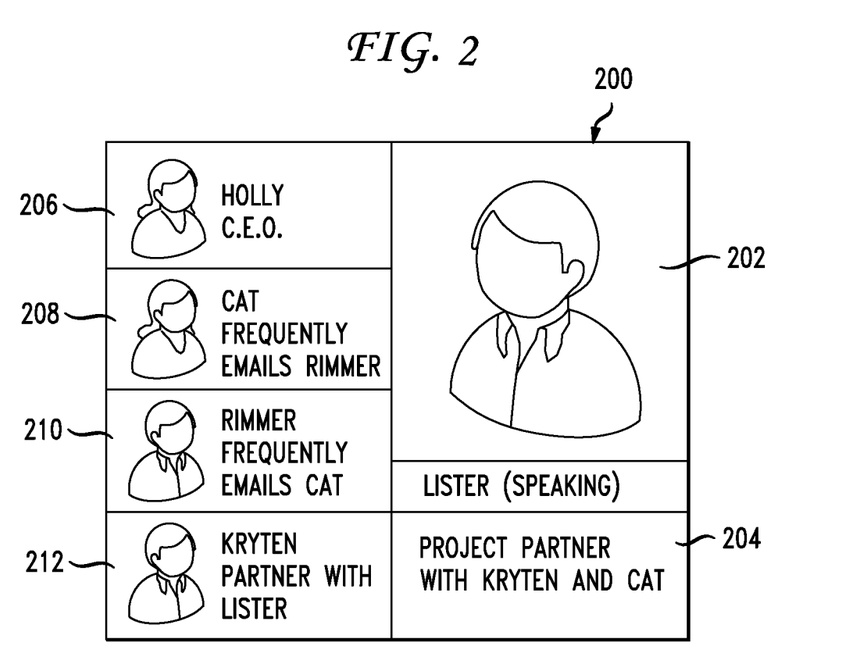
FIG. 2 illustrates an example user interface for a video conference incorporating meeting roster awareness.

FIG. 2 illustrates an example user interface 200 for a video conference incorporating meeting roster awareness. This user interface 200 can provide the same view for each participant. In this conference, the conferencing server 102 can feature Lister 202, who is speaking, more prominently, as well as a text description 204 of Lister's relationship to the conference call based on current and/or prior context information and Lister's relationship to specific other participants, in this case Kryten and Cat. The user interface 200 can provide a reduced or prioritized set of information for other participants 206, 208, 210, 212 in the conference. The user interface 200 can change and adapt as additional prior context information is retrieved, processed, or interpreted in light of an updated current context of the conference. In this case, the user interface 200 provides textual indications of relationships by displaying names, titles, context snippets indicating a prior context or prior relationship, and so forth. The text description 204 can include other non-text content, such as images, interactive charts or graphs, video, audio snippets, and so forth.

Figure 3:
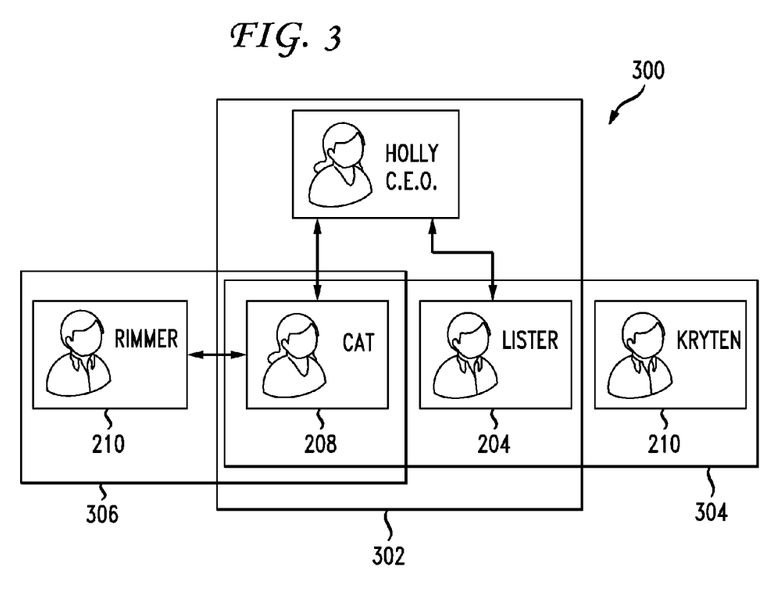
FIG. 3 illustrates a first example representation of a graph of relationships between conference participants.

FIG. 3 illustrates a first example graphical representation 300 of a graph of relationships between conference participants. In this example, the conferencing server 102 examined prior context and communication information to organize the participants into various groups. The conferencing server 102 can identify that Holly 206, Cat 208, and Lister 204 are in the same organization such as a company, and places them in an organizational box 302. The conferencing server 102 can further arrange the participants within the organizational box 302 to reflect rank, position, title, or other aspects within the organization. The conferencing server 102 can further identify that Cat 208, Lister 204, and Kryten 212 were assigned to be project partners in the previous meeting. The conferencing server 102 can render this project partnership relationship as a box 304 containing Cat 208, Lister 204, and Kryten 212. The conferencing server 102 can further identify that Rimmer 210 and Cat 208 frequently email each other and have a close working relationship relating to a topic that is relevant to the current context of the conference call. The conferencing server 102 can render this close working relationship as a box 306 containing Rimmer 210 and Cat 208. While FIG. 3 depicts boxes 302, 304, 306 with the same kind of line, the conferencing server 102 can render different styles of boxes or visual similarities to indicate a common relationship between participants. The conferencing server 102 can present a graphical organization of participants reflecting the relationships gleaned from prior context as a main graphical representation, or secondarily such as when a user clicks or hovers a cursor for more information. The conferencing server 102 can render all or part of such a graphical organization as shown in FIG. 3, such as rendering only a zoomed in portion, or filtering parts of the graphical organization that are familiar to a particular user.

Figure 4:
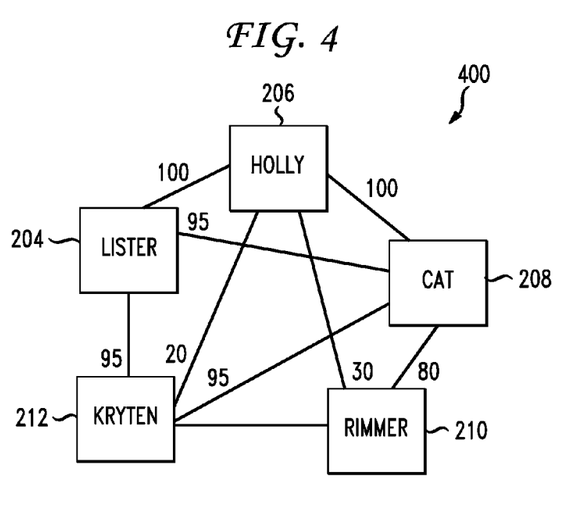
FIG. 4 illustrates a second example representation of a graph of relationships between conference participants.

FIG. 4 illustrates a second example graphical representation 400 of a graph of relationships between conference participants Lister 204, Holly 206, Cat 208, Rimmer 210, and Kryten 212. This graphical representation 400 depicts each of the participants as a box, icon, image, text, or some other visual element representing a node in a graph. Then the system can depict the relationships as a network graph between the various participants with lines connecting nodes in the graph representing the relationship, the relationship type, or relationship strength, for example. In this example, the lines connecting Lister 204, Holly 206, and Cat 208 are marked as 95, indicating a strong connection because they are members of the same organization. Various other lines are presented reflecting other relationship types and strengths. In some examples, the system renders no line at all, such as between Lister 204 and Rimmer 210, indicating that the system is unaware of any prior context information between them. While numerical values are depicted herein, various other indications of relationship can be implemented, such as line thickness, color, line style, opacity, directionality, animation, and so forth. Further, relationships can be indicated by rendering participants with close relationships in close proximity to one another.

While the example in FIG. 4 shows simple numerical values on a scale of 1 to 100 for relationship strength, the system can provide additional information indicating the relationship and/or the source of the information upon which the relationship was determined. A user can interact with the graph to expose additional information about a particular relationship, such as clicking on one of the lines connecting two participants. Further, the indication of relationship strength can include non-visual components, such as an audible indication played over the conference audio. The indication of relationships and the various relationship attributes can be rendered on the same device as the main conference, such as in a portion of a web conference window on a desktop or laptop computer, or can be rendered on a second screen device, such as a smartphone or tablet computing device, other than the main device where the conference is presented. The system can display relationships as a score relative to others, or as a text description such as boss, secretary, manager, CEO, collaborator, partner, etc.

Figure 5:
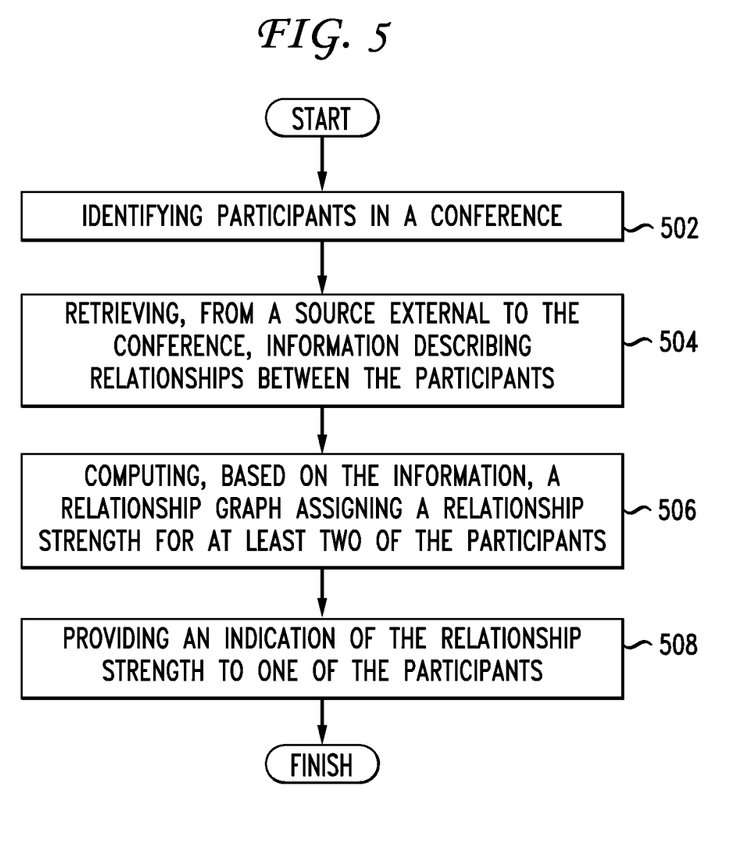
FIG. 5 illustrates an example method embodiment for generating relationship information for participants of a conference call.
Figure 6:
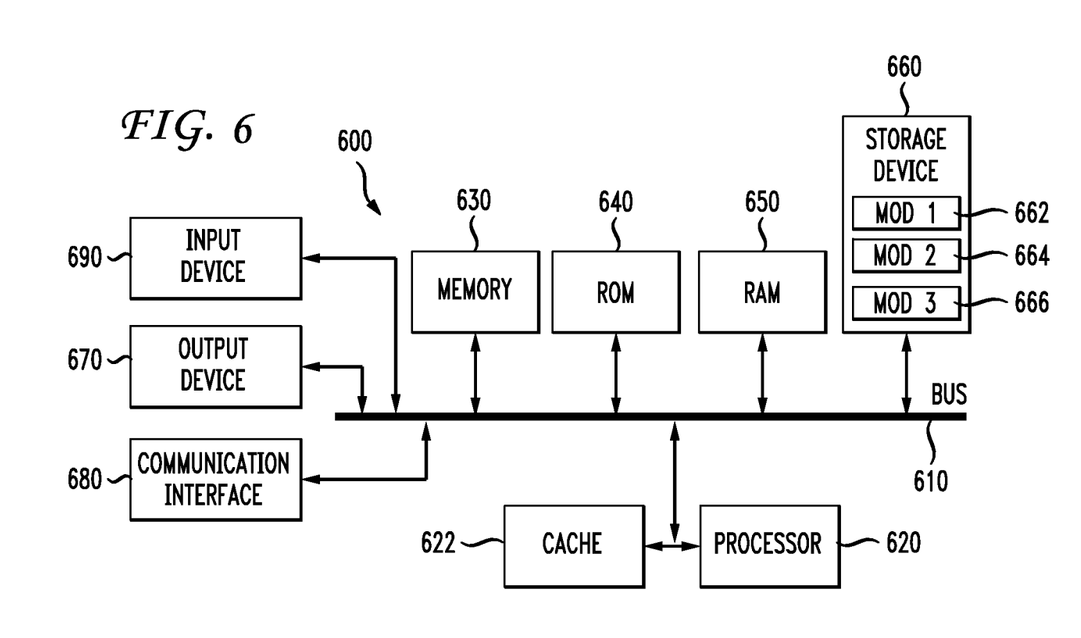
FIG. 6 illustrates an example computing system embodiment.

Having disclosed some basic system components and concepts, the disclosure now turns to the exemplary method embodiment for generating relationship information for participants of a conference call as shown in FIG. 5. For the sake of clarity, the method is discussed in terms of an exemplary system 600, as shown in FIG. 6, configured to practice the method. The steps outlined herein are exemplary and can be implemented in any combination or order thereof, including combinations that exclude, add, or modify certain steps.

An example system can identify participants in a conference (502), and retrieve, from a source external to the conference, information describing relationships between the participants (504). External sources can include, for example, participant home pages or web pages, employee directories, professional social networks, organizational charts, group membership, and communication or collaboration histories that are not connected to the roster of the web conference. The information describing relationships between the participants can include communication frequency, communication duration, communication content, quantity of communications, joint authorship of a document, or shared calendar events. When a user joins the conference or at some other time, the system can request login credentials or other authorization to access a social network, and use that authorization to access non-public social network data as part of the external source of data. In some cases, the external source of data is publicly available, and in other cases, such as a social network or corporate directory, the user may provide some additional credentials or authorization. The system can automatically search for and identify the external sources for each user, or can rely on users indicating or selecting which external sources to use. For example, a participant may want the conference system to use a professional social network, such as LinkedIn, as an external source while excluding a personal social network, such as Facebook. In the case of a communications history, for example, a participant can explicitly exclude particular date ranges, communication topics, message threads, recipients or senders, and so forth, to preserve security, privacy, and confidentiality of certain relationships or conversations. The system can provide a preview of the source information about a participant's relationships to the participant for approval. Similarly, the system can provide a preview of what will be available for others to see about that participant, so that the participant can approve, modify, or control what is presented about him or her. A user can add information to display to others in addition to the relationship data retrieved from the external resources.

The system can compute, based on the information, a relationship graph assigning a relationship strength for at least two of the participants (506), and provide an indication of the relationship strength to one of the participants (508).

The indication of the relationship strength can include a simple indication that a relationship exists, or can be more complex, such as an indication of a position in an organizational hierarchy, a number of communications between two participants, content or snippets of content from the relationship history, a title, a common organization, communication frequency, relationship duration, and so forth. In one embodiment, the indication is an image or icon representing the relationship type, duration, strength, source, or some other attribute of the relationship. For example, the indication of the relationship strength can include rendering a numerical indication of the relationship strength between two participants. As another example, the system can provide the indication of the relationship strength by identifying an attribute of the relationship strength, and rendering the attribute as part of the indication. The system can display the relationship information when a user hovers a cursor over a representation of a participant in a video conference display, in a similar manner to hovering over an email address in an email program can display additional contact information about that person if such information is available in a contact list.

Further, a user can provide input to the system directed to the indication of relationship strength. Responsive to receiving the input, the system can provide additional details describing the indication of the relationship strength. The additional details can be provided as a multi-level hierarchy through which the user can drill down to progressively more and more specific details. In one embodiment, the system can receive additional participant or relationship information on the fly, and provide the additional information with the indication of the relationship strength either on demand or as the additional information is received. In one variation, the system can provide an alert that additional information has been received, and if the user interacts with the alert, then the system can present all or part of that additional information to the user. In another variation, the system evaluates how well one of the participants knows the relationship strength, and adjusts the type or quantity of information in the indication based on the evaluation. The system can detect which relationships a user is aware of or should be aware of, and not render those relationships or render a reduced set of information describing that relationship.

With reference to FIG. 6, an exemplary system 600 includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache 622 of high speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer readable storage media provide nonvolatile storage of computer readable instructions, data structures, program modules and other data for the computing device 600. In one aspect, a hardware module that performs a particular function includes the software component stored in a non-transitory computer-readable medium in connection with the necessary hardware components, such as the processor 620, bus 610, display 670, and so forth, to carry out the function. The basic components are known to those of skill in the art and appropriate variations are contemplated depending on the type of device, such as whether the device 600 is a small, handheld computing device, a desktop computer, or a computer server.

Although the exemplary embodiment described herein employs the hard disk 660, it should be appreciated by those skilled in the art that other types of computer readable media which can store data that are accessible by a computer, such as magnetic cassettes, flash memory cards, digital versatile disks, cartridges, random access memories (RAMs) 650, read only memory (ROM) 640, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations discussed below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited non-transitory computer-readable storage media. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any graphical representation of open communication lines. Those skilled in the art will readily recognize various modifications and changes that may be made to the principles described herein without following the example embodiments and applications illustrated and described herein, and without departing from the spirit and scope of the disclosure.

We claim:

1. A method comprising:
   identifying, via a processor, participants in a conference;
   retrieving, from at least one source external to the conference, data indicative of relationships between at least two of the participants in the conference, the data comprising a communication history for communications exchanged between the at least two of the participants prior to the conference, and wherein the communications history comprises a communication frequency corresponding to a number of the communications exchanged between the at least two of the participants;
   computing, based on the data retrieved and at least partially based on the communication frequency, a relationship graph assigning a relationship strength between the at least two of the participants; and
   providing an indication of the relationship strength between the at least two of the participants to at least one of the participants in the conference.

2. The method of claim 1, wherein the indication is provided to all participants in the conference except the at least two of the participants.

3. The method of claim 1, wherein the data and the communications history further comprises at least one of historical communication duration, communication content, joint authorship of a document, or shared calendar events between the at least two of the participants.

4. The method of claim 1, wherein providing the indication of the relationship strength further comprises:
   rendering a numerical indication of the relationship strength between the at least two of the participants.

5. The method of claim 1, wherein providing the indication of the relationship strength further comprises:
identifying an attribute of the relationship strength; and
rendering the attribute as part of the indication.

6. The method of claim 1, further comprising:
receiving input from a user directed to the indication; and
responsive to receiving the input, providing additional details describing the indication of the relationship strength.

7. The method of claim 1, further comprising:
providing the relationship graph with the indication to a participant in the conference;
receiving from the participant in the conference, additional information indicative of the relationships between the at least two participants; and
providing the additional information with the indication of the relationship strength to the at least one of the participants in the conference.

8. The method of claim 1, further comprising:
performing an evaluation of how well one of the participants in the conference knows the relationship strength;
adjusting the indication based on the evaluation, wherein the indication for relationships that the one of the participants is aware of includes less information describing the relationships than the indication for the relationships that the one of the participants is unaware of.

9. A system comprising:
a processor; and
a computer-readable storage medium having instructions stored thereon which, when executed by the processor, cause the processor to:
identify participants in a conference;
identify, for a participant in the conference, other participants in the conference with which the participant is unfamiliar;
retrieve, from a source external to the conference, information describing relationships between the other participants, the information comprising a communications history for communications exchanged between the other participants prior to the conference, and wherein the communications history comprises a communication frequency corresponding to a number of the commuications exchanged between the other participants;
compute, based on the information retrieved and at least partially based on the communicaiton frequency, a relationship graph assigning a relationship strength for each participant pair in the relationship graph; and
provide an indication of the relationship strength between the other participants to the participant.

10. The system of claim 9, wherein the source external to the conference comprises at least one of a social network, an organizational chart, a directory, or group membership.

11. The system of claim 9, wherein the information and the communications history between the other participants further comprises at least one of historical communication duration, communication content, joint authorship of a document, or shared calendar events between the other participants.

12. The system of claim 9, wherein providing the indication of the relationship strength further comprises at least one of rendering a numerical indication of the relationship strength between the other participants, or identifying an attribute of the relationship strength and rendering the attribute as part of the indication.

13. The system of claim 9, the instructions, when executed by the processor, further causing the processor to:
receive input from the participant directed to the indication; and
responsive to receiving the input, provide additional details describing the indication of the relationship strength.

14. The system of claim 9, the instructions, when executed by the processor, further causing the processor to:
providing the relationship graph with the indication to one of the other participants in the conference;
receive from the one of the other participants in the conference additional information describing the relationships between the other participants; and
provide the additional information with the indication of the relationship strength associated with the other participants to at least one of the participants in the conference.

15. A server, comprising:
a processor; and
a computer-readable storage medium having instructions stored thereon that, when executed by the processor, cause the processor to:
identify a pair of participants in a conference, wherein at least one of the pair of participants in the conference is unfamiliar to a requestor;
retrieve, from a source external to the conference, information describing a relationship between the pair of participants, the information comprising a communications history for communications exchanged between the pair of participants prior to the conference, and wherein the communications history comprises a communication frequency corresponding to a number of the communications exchanged between the pair of participants;
receive, from at least one of the pair of participants, an input limiting the communications history for use in computing a relationship strength the pair of participants;
compute, based on the information retrieved and using the limited communications history and communication frequency, a relationship strength for the pair of participants; and
provide an indication of the relationship strength between the pair of participants to the requestor in association with the conference.

16. The server of claim 15, wherein the source external to the conference comprises at least one of a social network, an organizational chart, a directory, or group membership.

17. The server of claim 15, wherein the information describing the relationship between the pair of participants comprises at least one of historical communication duration, communication content, joint authorship of a document, or shared calendar events between the pair of participants.

18. The server of claim 15, wherein prior to receiving the input limiting the communications history, the instructions, when executed by the processor, further cause the processor to:
provide an interface to the at least one of the pair of paticipants for selectively excluding one or more of particular date ranges, communication topics, message threads, recipients, or senders from the communications history for use in computing the relationship strength between the pair of participants.

19. The server of claim 15, wherein providing the indication of the relationship strength further comprises at least one of rendering a numerical indication of the relationship strength between the pair of participants, or identifying an attribute of the relationship strength and rendering the attribute as part of the indication.

20. The server of claim 15, the instructions, when executed by a processor, further cause the processor to:
   receive input from a user directed to the indication; and
   responsive to receiving the input, provide additional details describing the indication of the relationship strength.

* * * * *

UNITED STATES PATENT AND TRADEMARK OFFICE
CERTIFICATE OF CORRECTION

PATENT NO. : 9,477,371 B2
APPLICATION NO. : 13/920388
DATED : October 25, 2016
INVENTOR(S) : John F. Buford, Kundan Singh and Venkatesh Krishnaswamy It is certified that error appears in the above-identified patent and that said Letters Patent is hereby corrected as shown below:

In the Claims

At Column 10, Line 42, delete "communication" and replace it with --communications-- therein.

At Column 11, Line 15, after "between the at least two" insert --of the-- therein.

At Column 11, Line 26, after "the indication for" delete "the" therein.

At Column 11, Line 45, delete "commuications" and insert --communications-- therein.

At Column 11, Line 48, delete "communicaiton" and insert --communication-- therein.

At Column 12, Line 38, after "relationship strength" insert --between-- therein.

At Column 12, Line 60, delete "paticipants" and insert --participants-- therein.

Signed and Sealed this
Third Day of January, 2017

Michelle K. Lee
*Director of the United States Patent and Trademark Office*